(No Model.) 3 Sheets—Sheet 1.

O. M. MORSE.
FLOUR BOLT.

No. 304,224. Patented Aug. 26, 1884.

Witnesses: Chas. J. Buchheit, Theo. L. Popp.

Orville M. Morse, Inventor.
By Wilhelm & Bonner, Attorneys.

(No Model.) 3 Sheets—Sheet 2.
O. M. MORSE.
FLOUR BOLT.
No. 304,224. Fig. 5. Patented Aug. 26, 1884.
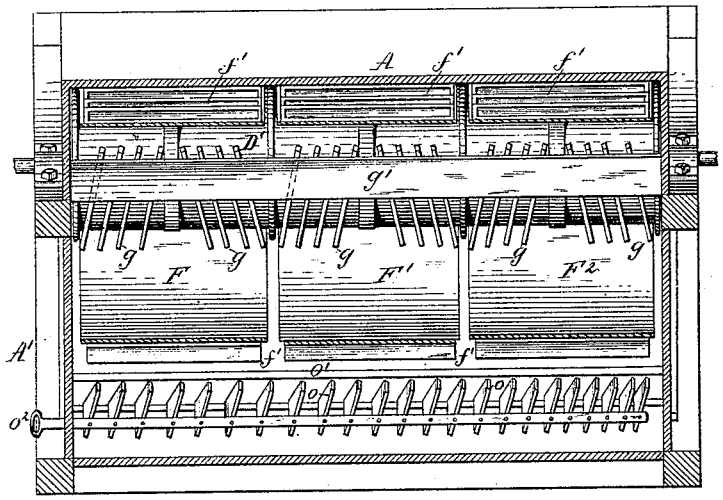
Fig. 6.
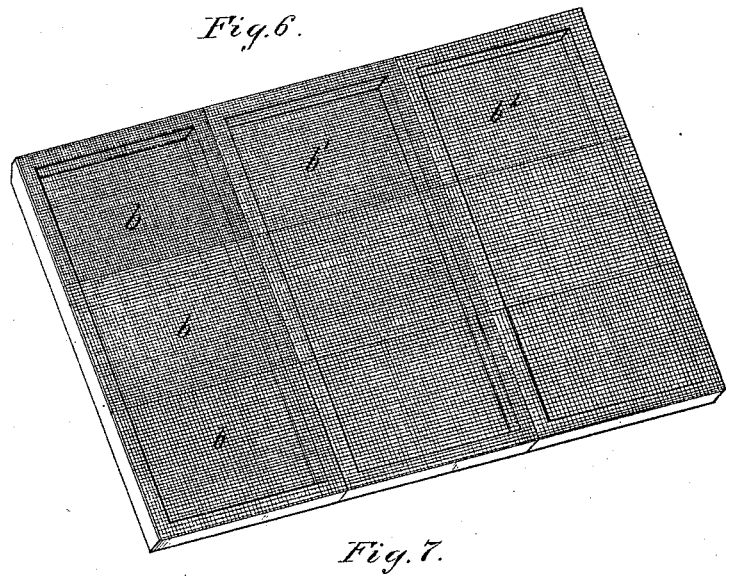
Fig. 7.
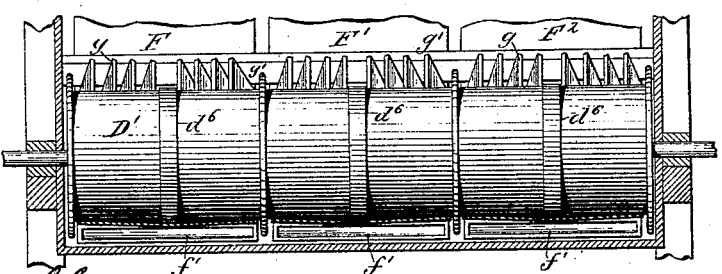
Witnesses: Chas. J. Buchheit, Theo. L. Popp
Inventor: Orville M. Morse
By Wilhelm & Bonner
Attorneys.

(No Model.) 3 Sheets—Sheet 3.
O. M. MORSE.
FLOUR BOLT.
No. 304,224. Patented Aug. 26, 1884.
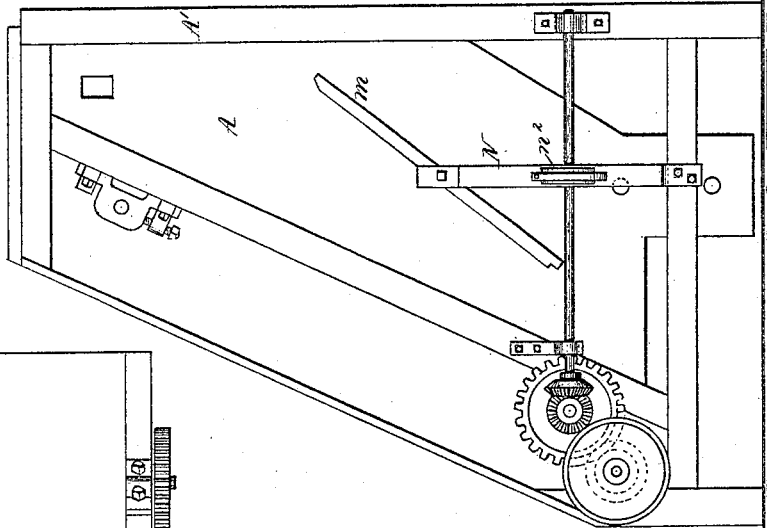
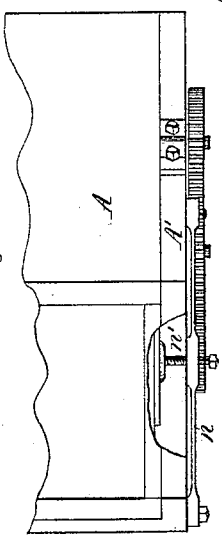
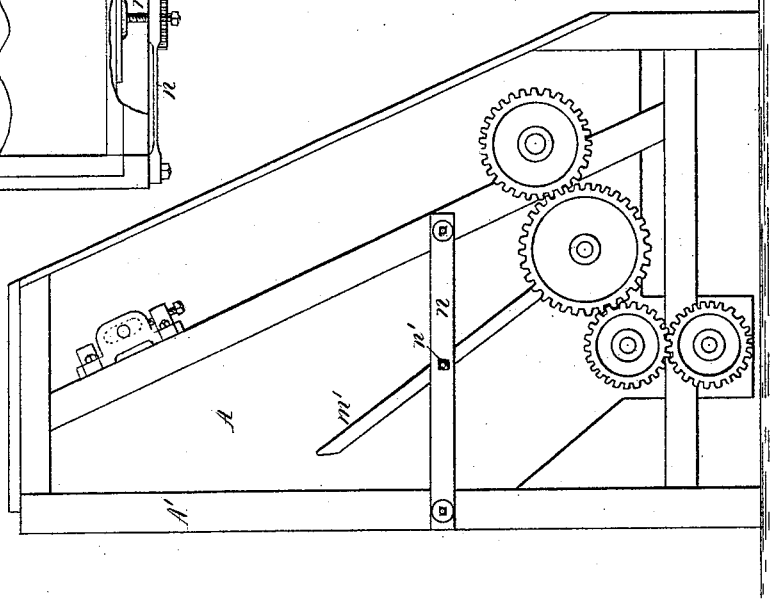

UNITED STATES PATENT OFFICE.

ORVILLE M. MORSE, OF JACKSON, MICHIGAN, ASSIGNOR TO THE KNICKER-BOCKER COMPANY, OF SAME PLACE.

FLOUR-BOLT.

SPECIFICATION forming part of Letters Patent No. 304,224, dated August 26, 1884.

Application filed December 12, 1883. (No model.)

*To all whom it may concern:*

Be it known that I, ORVILLE M. MORSE, of Jackson, in the county of Jackson and State of Michigan, have invented a new and useful Improvement in Flour-Bolts, of which the following is a specification.

This invention relates to an improvement in that class of bolting or separating machines which are composed of an inclined sieve and an elevating mechanism, whereby the material which has passed over the sieve and escapes from the lower end thereof is elevated and delivered upon the upper end of the sieve, and in which the material is at the same time caused to move gradually across the sieve, so that the material is repeatedly elevated and caused to flow over the inclined sieve in passing through the machine. Apparatus of this character is described and shown in Letters Patent of the United States No. 225,536, dated March 16, 1880, and No. 255,002, dated March 14, 1882, to which reference is here made for a more complete description of the same.

The object of the present invention is to improve the construction and increase the efficiency of the machine; and my invention consists to that end of the improvements which will be hereinafter fully set forth, and pointed out in the claims.

Figure 1:
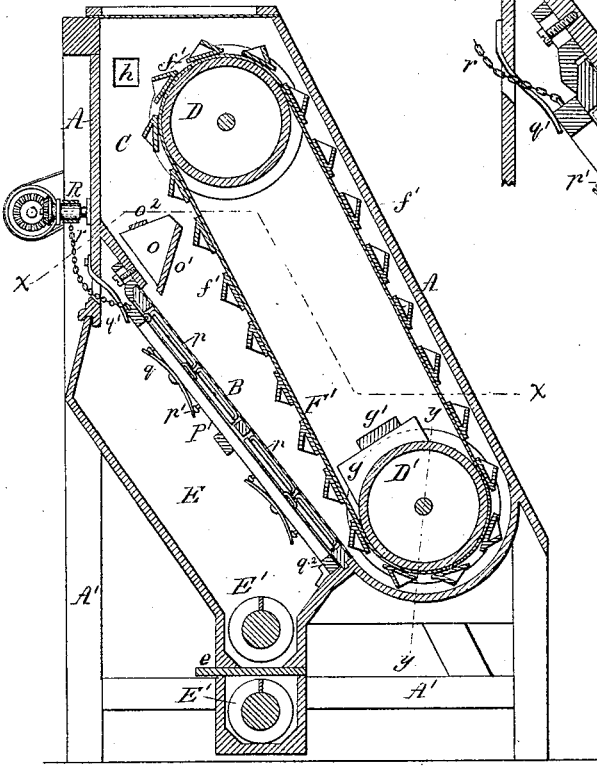
Figure 2:
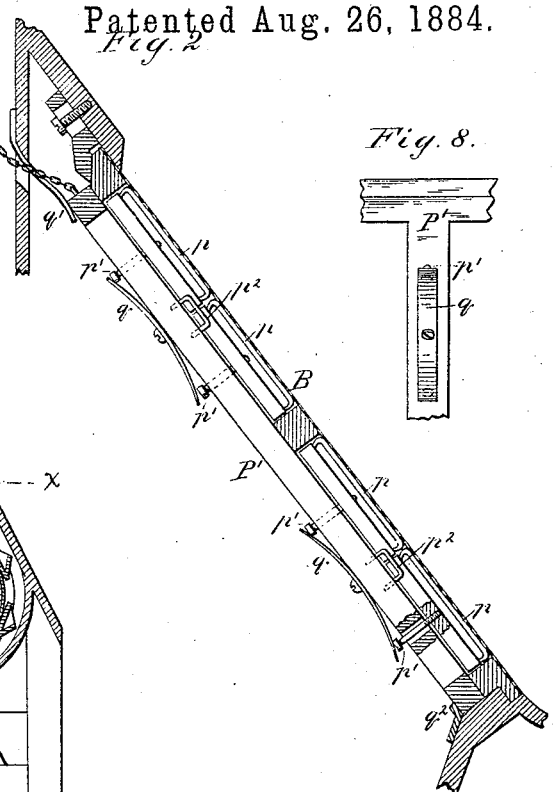
Figure 8:
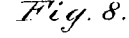
Figure 3:
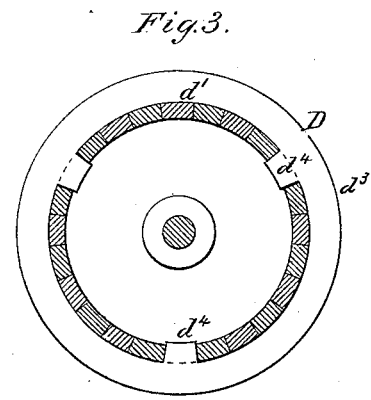

In the accompanying drawings, consisting of three sheets, Figure 1 represents a vertical cross-section of a flour-bolt provided with my improvements. Fig. 2 is a cross-section, on an enlarged scale, of the inclined screen and wipers. Fig. 3 is a cross-section, and Fig. 4 a fragmentary longitudinal section, of the drum at the head of the elevator. Fig. 5 is a horizontal section in line $x\ x$, Fig. 1. Fig. 6 is a perspective view of the inclined screen. Fig. 7 is a vertical longitudinal section in line $y\ y$, Fig. 1. Fig. 8 is a fragmentary view of the under side of the wiper-frame. Figs. 9 and 10 are end elevations of my improved machine. Fig. 11 is a plan view of the spring at the end of the screen-frame.

Like letters of reference refer to like parts in the several figures.

A represents the stationary case of the machine, secured to a frame, A', and constructed in any suitable and well-known manner.

B represents the separating or bolting screen, arranged in an inclined position within the case A, and composed of a suitable number of sections, $b\ b'\ b^2$, arranged side by side. The several sections are clothed with bolting-cloth of the proper mesh, in accordance with the particular kind of work for which the machine is designed. Ordinarily the sections are clothed with cloth of increasing coarseness from the head toward the tail of the machine, the section $b$ being covered with the finest and the section $b^2$ with the coarsest cloth. The screen is so inclined that the material will flow over the same by gravity. Each of the sections $b\ b'\ b^2$ is composed of several sections of bolting-cloth of different mesh, the finest cloth being arranged at the upper end of the screen and the coarsest cloth at the lower end of the screen, in order to compensate for the increased velocity with which the material moves over the lower portion of each section of the screen. As the material flows over each section it gathers speed; and when the screen-section is clothed with cloth of the same fineness from its upper to its lower end the bolting capacity of the screen becomes less toward the lower end of the section in the same measure as the speed of the material increases. By enlarging the meshes of the lower portion of the screen, the material is enabled to pass more readily through the screen, and the bolting capacity of the screen is rendered more uniform throughout the length of each section.

C represents the meal-chamber above the screen B, in which the elevating mechanism is arranged, and which receives the material to be separated or bolted.

E represents the flour-chamber underneath the screen, which receives the fine material which has been bolted through the inclined screen, and which is provided with suitable conveyers, E', and slides $e$, for drawing off the various grades of the bolted material.

Figure 4:
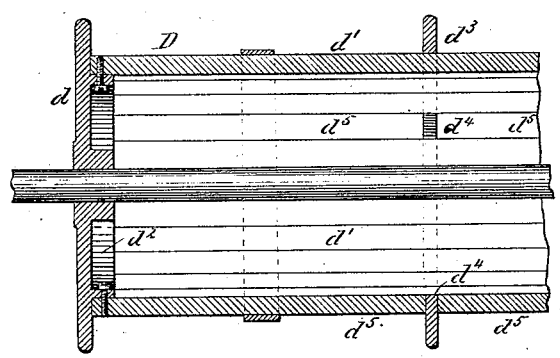

The elevating mechanism consists of pulleys or drums D D' and buckets $f'$, secured to endless belts or chains F F' F², running around the pulleys D D'. The upper drum, D, is composed of end disks or heads, $d$, and connecting-staves $d'$, which are secured to annular flanges $d^2$, formed on the inner sides of the flanges $d$. $d^3$ are intermediate disks, which are secured to the drum D between the elevator-belts F F' F², to prevent these belts from crowding each other or running one upon the other. The rings $d^3$ are preferably secured to the drum by inwardly-projecting lugs or lips $d^4$, formed on the rings $d^3$ and projecting between the staves of the drum. The staves which are located between the projections $d^4$ of the rings extend from end to end of the drum. The rings $d^3$ are held against longitudinal displacement by short staves $d^5$, which abut against the projections $d^4$ on both sides thereof, as represented in Fig. 4. The lower drum, D', is provided on its surface with rings $d^6$, arranged centrally with reference to each of the elevator-belts, and forming enlargements on the drum, whereby the elevator-belts are centered and prevented from shifting their position laterally.

$g$ represents scraper-blades, which bear upon the upper side of the lower drum, D', and which are secured to a board or bar, $g'$, extending through the machine between the two branches of the elevator-belts. The scrapers $g$ are inclined from the center of each elevator-belt toward both edges thereof, and serve to remove the material which may tend to adhere to the drum D' from the drum, and to work the material toward the edges of each elevator-belt, where it is discharged through the spaces between the several elevator-belts and between the belts and the end walls of the casing A, and falls to the bottom of the casing.

$h$ represents the feed opening or spout, through which the material to be bolted or separated is fed into the casing of the machine.

The ends of the screen-frame project through openings $m$ $m'$, formed in the end walls of the casing A. One end of the screen-frame rests against a spring, $n$, which is secured with its ends to the stationary frame of the machine, and provided at its center with a set-screw, $n'$, which bears against the end of the screen-frame, and by which the tension of the spring can be regulated.

N represents a knocker, which is actuated by a cam, $n^2$, or any other suitable device, and which strikes the opposite end of the screen-frame. The spring $n$ receives the blow of the knocker, and by its elasticity vibrates the screen, and the intensity or extent of the vibration is regulated by adjusting the set-screw $n'$.

$o$ represents adjustable deflecting-boards pivoted to a stationary board, $o'$, which extends through the machine above the screen and underneath the head of the elevating mechanism. The deflecting-boards $o$ are connected by a shifting-bar, $o^2$, the end of which extends through an opening in the casing, and by means of which the position of the deflecting-boards can be adjusted. These deflecting-boards serve to deflect the material as it is discharged from the elevator, and they can be so adjusted as to turn or deflect the material either toward or from the head of the machine, thereby accelerating or retarding the tendency of the material to work toward the tail end of the machine, which tendency is imparted to the material by a slight inclination or pitch of the machine from its head toward its tail. By inclining the deflecting-boards more or less toward the head of the machine the progress of the material toward the tail end of the machine is more or less retarded. The deflecting-boards are arranged more closely together as they approach the tail end of the machine, as represented in Fig. 5, thereby retarding the material more and more in the same measure as its quantity grows less by the removal of the fine material which is bolted out.

P represents a wiper or cleaner which is arranged underneath the inclined screen B, so as to bear against the lower surface of the screen. This wiper or cleaner is composed of a series of adjustable wipers or cleaners, $p$, attached to a frame, P', in such manner that the individual wipers $p$ can readily adjust themselves to the lower surface of the screen. Each of the individual wipers or cleaners $p$ consists of a stock or bar provided on its upper side with a cleaning wire or brush, or a strip of rubber or felt or other flexible material. Each of the stocks is provided with a pin or pivot, $p'$, which extends through an opening in the frame P'.

$q$ represents springs which are secured to the under side of the frame P', and which bear upon the lower ends of the pivots $p'$, so as to hold the wipers $p$ against the lower surface of the screen. The pivots $p'$ are fitted loosely in the frame P', so as to permit of a limited rocking movement of the wiper on its pivot, thereby enabling the wipers to adjust themselves to the position of the cloth when the latter bags or sags between the side bars of the screen-frame. The wipers are prevented from turning on their pivots $p'$ by projections or stops $p^2$, formed on the upper side of the frame P' on both sides of the stocks. Each series of individual wipers $p$ is arranged in the direction in which the screen is inclined, and, when the screen-frame is divided on the under side of the screen into a number of panels, a series of wipers, $p$, is arranged in each panel, and the horizontal movement of the wiper-frame P' is limited to the length of one panel. The wiper-frame P' is supported in ways $q'$ $q^2$, secured to the stationary frame or casing of the machine, and receives a horizontal reciprocating movement by a chain or cord, $r$, which connects the wiper-frame P' with an endless belt or chain, R, arranged at the front side of the casing of the machine.

I claim as my invention—

1. In a separator, the combination of a sieve or screen having the proper pitch or inclination to cause the material to flow over it by gravity, and having its mesh increasing in coarseness from its upper end to its lower end, to increase the separating capacity of the screen as the velocity of the material increases, and an elevator whereby the material escaping from the lower end of the screen is returned to its upper end, substantially as set forth.

2. In a separator, the combination of a sieve or screen having the proper pitch or inclination to cause the material to flow over it by gravity, and composed of sections of different degrees of fineness, arranged side by side, each section having its mesh increasing in coarseness from its upper to its lower end, and an elevator whereby the material escaping from the lower end of the screen is returned to the upper end, substantially as set forth.

3. The combination, with an inclined screen, of a series of belt-elevators, arranged side by side, and a belt-supporting drum having annular enlargements or projecting rings arranged in the center line of each belt, whereby each elevator is centered and retained in its proper position, substantially as set forth.

4. The combination, with an endless elevator belt or apron and the drum or pulley around which it runs, of inclined scrapers adapted to move the material toward the side or end of the drum or pulley, substantially as set forth.

5. The combination, with an endless elevator belt or apron and the drum or pulley around which it runs, of scrapers bearing against said drum or pulley and inclined from the middle toward both ends thereof, substantially as set forth.

6. The combination, with a separating-screen, of a cleaner composed of a movable carrier, brushes or wipers loosely attached to said carrier, and a spring whereby each brush or wiper is held in contact with the screen, substantially as set forth.

7. The combination, with a separating-screen, of a cleaner composed of a movable frame, P', brushes or wipers $p$, provided with pins $p'$, and springs $q$, secured to the frame P' and bearing against the pins $p'$, substantially as set forth.

8. The combination, with an inclined screen and an elevator whereby the material escaping from the lower end of the screen is returned to its upper end, of deflecting-boards arranged more closely together toward the tail end of the machine, whereby the movement of the material toward the tail of the machine becomes more retarded in the same measure as the material becomes less in quantity, substantially as set forth.

9. The combination, with the stationary frame A and inclined screen B, of a knocker, N, a spring, $n$, secured at its ends to the stationary frame, and a set-screw, $n'$, adjustably secured in said spring, and bearing against the frame of the screen, substantially as set forth.

Witness my hand this 19th day of November, 1883.

ORVILLE M. MORSE.

Witnesses:
 JNO. G. MUNDY,
 CHAS. F. GEYER.